United States Patent [19]
Criffield

[11] 3,774,394
[45] Nov. 27, 1973

[54] GAS TURBINE ENGINE FUEL DRAIN SYSTEM AND COOPERATING VALVE AND PUMP MEANS

[75] Inventor: Melvin E. Criffield, Cincinnati, Ohio

[73] Assignee: General Electric Company, Cincinnati, Ohio

[22] Filed: Aug. 9, 1971

[21] Appl. No.: 170,131

[52] U.S. Cl. .................. 60/39.09 R, 60/39.28 R
[51] Int. Cl. ..................... F23n 5/24, F02c 9/00
[58] Field of Search ..................... 60/39.09 R

[56] References Cited
UNITED STATES PATENTS

| | | | |
|---|---|---|---|
| 3,498,056 | 3/1970 | Avery | 60/39.09 |
| 2,877,839 | 3/1959 | Cody | 60/39.09 |
| 3,344,602 | 10/1967 | Davies et al. | 60/39.09 |
| 2,619,162 | 11/1952 | Feilden | 60/39.09 |
| 2,881,827 | 4/1959 | Roche et al. | 60/39.09 |
| 2,846,845 | 8/1958 | Parker | 60/39.09 |

Primary Examiner—Douglas Hart
Assistant Examiner—Warren Olsen
Attorney—Derek P. Lawrence, James M. Kipling, Lee H. Sachs, Frank L. Neuhauser, Oscar B. Waddell and Joseph B. Forman

[57] ABSTRACT

A fuel drain system for an aircraft gas turbine engine includes an eductor pump and valve means therefor to direct both fuel pressurized by the engine during engine spin-down and fuel drained from the fuel supply system upon engine shutoff to the eductor so as to recycle the latter to a point in the fuel supply system which is upstream of the fuel supply system shutoff valve.

7 Claims, 4 Drawing Figures

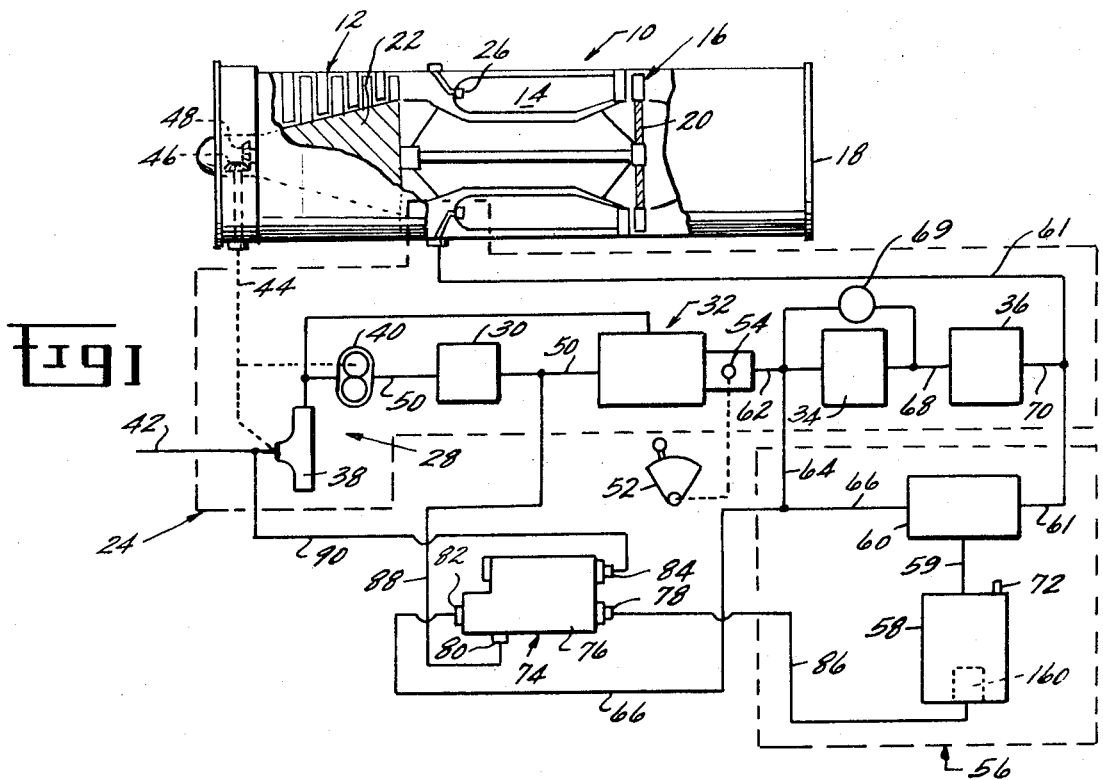
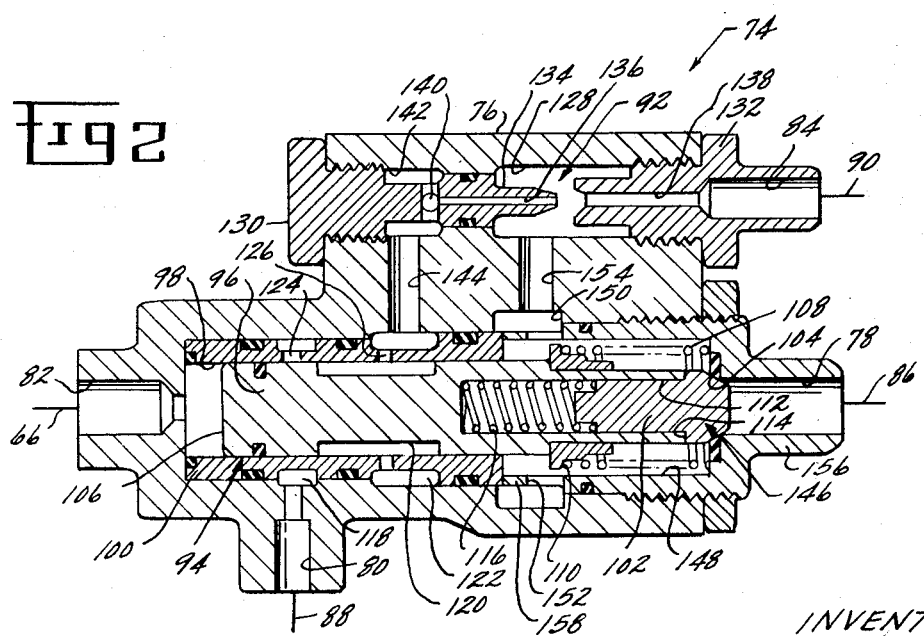

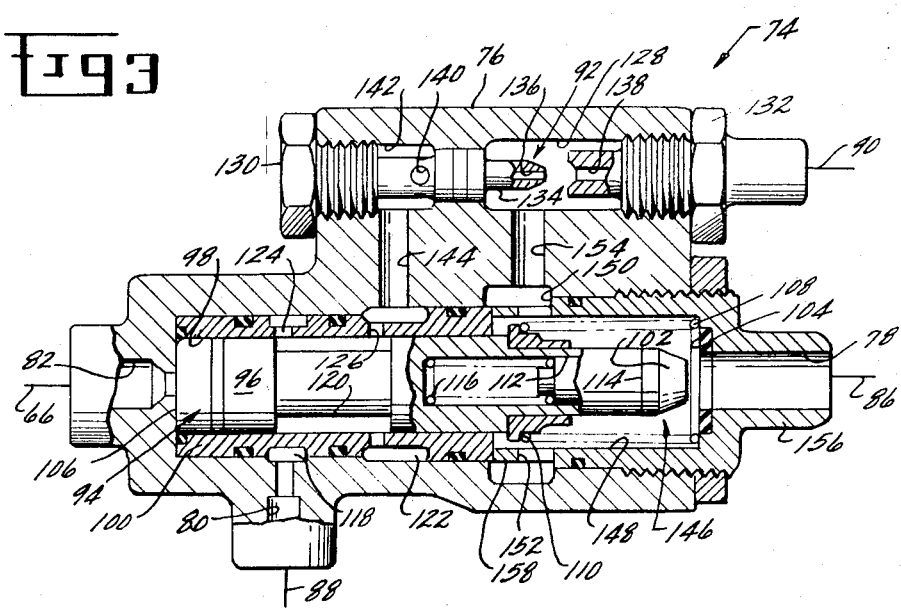
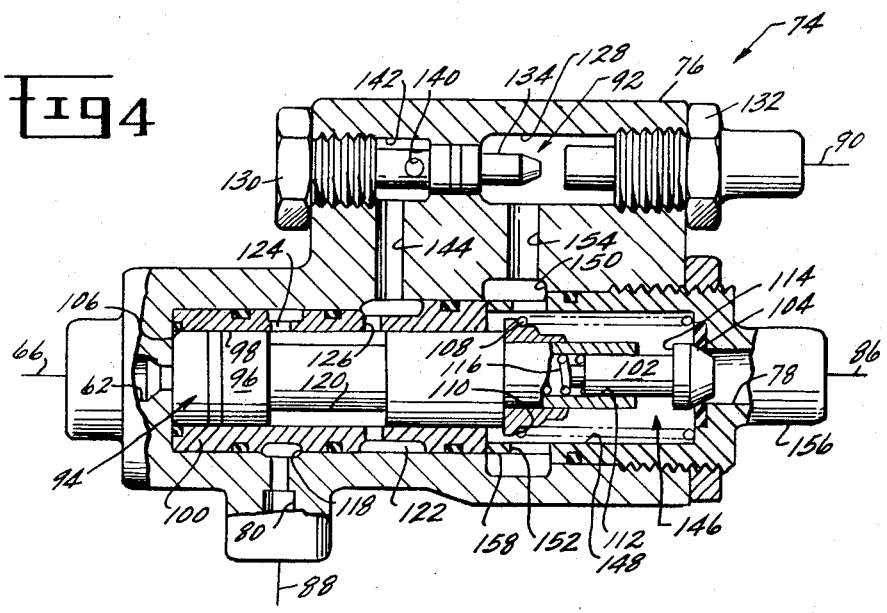

GAS TURBINE ENGINE FUEL DRAIN SYSTEM AND COOPERATING VALVE AND PUMP MEANS

This invention relates to gas turbine engines and, more particularly, to a fuel drain system and cooperating valve and pump means therefor.

In aircraft gas turbine engines, it is necessary or desirable to prevent drainage of residual fuel (the fuel in that portion of the fuel supply system which is downstream of the fuel shutoff valve) into the combustion chamber of the engine upon engine shutdown so as to prevent coking and possible fire hazards.

To this end, it has heretofore been common practice to provide a drain can or container for collection of such residual fuel, with the container being connected with the fuel supply manifold through a valve which opens upon engine shutoff. With the valve open, the system is arranged to drain the residual fuel into the container using gravity and/or the pressure differential between the engine combustor and the container, which is usually vented overboard.

Since the amount of residual fuel drained into the container upon each engine shutdown may be as much as one gallon or more, it is generally necessary, due to the size limitations of the container and other considerations, that the container be emptied between engine shutdowns.

While numerous methods or systems for emptying such containers between engine shutdowns have been heretofore employed or proposed, such methods generally suffer from the disadvantage of either emptying the contents of the container into the atmosphere upon aircraft takeoff or requiring the aircraft ground crew to manually empty the container. For example, one arrangement which has heretofore been in common use directs ram pressure to the container to force the collected fuel to drain to the atmosphere upon aircraft takeoff. With increased air traffic and the high population density in the vicinity of most airports, such systems have been the subject of increasing concern from the standpoint of environmental pollution.

While eductor pumps which run continuously using motive fuel extracted from the low pressure or centrifugal pump of two pump engine fuel pressurizing systems have been used in the past to continuously and automatically pump fuel vapor from various points in the fuel system to the inlet of the centrifugal pump, it is believed that such an arrangement, with respect to the fuel drain can, would not provide sufficient motive fuel energy to pump the residual fuel against the pressure head of an aircraft boost pump. It must also be borne in mind that gas turbine engines are started at substantially reduced rotor speeds relative to normal operation and, hence, at substantially reduced fuel pressures and flow rates. In some engines the start-up fuel pressures and flow rates are not sufficiently high to provide fuel in the quantities required to enable ignition and, at the same time, to provide fuel to drive a continuously operating eductor pump, as in the above-mentioned vapor eductor system. At the same time, however, it is believed that an effective system for use with the drain can must be arranged to utilize these reduced engine start-up fuel pressures and flow rates to empty the drain can in the event of an unsuccessful start-up attempt.

One object of this invention is a gas turbine engine fuel supply manifold and nozzle drain system which avoids the foregoing problems.

A further object of this invention is to provide an economical and reliable system for use with a gas turbine engine which recycles residual fuel upon engine shutoff.

A still further object of this invention is a system, as above, which employs an eductor pump and is adapted to utilize motive fuel pressure extracted from the engine fuel pumps only after engine shutoff.

Yet another object of this invention is to provide a compact and economical eductor pump and valve assembly for use in the fuel drain system of this invention.

Briefly, the above and other objects of this invention which will become apparent upon reading hereinafter are achieved in the present invention by providing an eductor pump and valve means, with the valve means being operative to direct fuel which is pressurized by the engine fuel pumps to the eductor pump, as motive fluid therefor, during engine spin-down. A drain valve is provided which opens when the engine shutoff valve is closed so as to drain the fuel downstream of the shutoff valve into a drain can. The eductor pump is connected to the drain can and the output of the high pressure engine fuel pump through the valve means such that upon engine shutoff, fuel is pumped from the drain can to a point in the fuel system upstream of the shutoff valve utilizing fuel pressurized by the engine during engine spin-down.

While the specification concludes with claims particularly pointing out and distinctly claiming the subject matter of this invention, it is believed that the invention will be better understood upon reading the following description of the preferred embodiment in conjunction with the accompanying drawings wherein:

FIG. 1 is a block diagram schematically showing the fuel drain system of this invention in cooperation with a gas turbine engine;

FIG. 2 is a cross-sectional view, drawn to an enlarged scale, of the eductor pump and valve means of FIG. 1, with the valve disposed in a first position;

FIG. 3 is a view like FIG. 2 showing the valve disposed in a second position; and FIG. 4 is a view like FIG. 2 showing the valve disposed in a third position.

Like reference numerals will be used in referring to like parts throughout the following description of the preferred embodiment.

With reference to FIG. 1, a gas turbine engine has been shown generally at 10 as including a compressor section 12, a combustion section 14 and a turbine section 16 for driving the compressor 12.

As will be understood, in operation air is pressurized by the compressor section 12 and delivered to the combustor section 14 where it is mixed with fuel. The resultant air/fuel mixture is burned in the combustor section 14 to produce a hot gas stream which is directed through the turbine section 16 and exhausted through a suitable outlet or nozzle 18 to produce a propulsive thrust. While the exemplary gas turbine engine 10 has been shown as being of the turbojet type and as including a single turbine rotor 20 and single compressor rotor 22, it will be understood that the present invention may be effectively employed with a turbofan engine having multiple rotors.

An exemplary system has been schematically shown at 24 for delivery of fuel to the combustion section 14 through a plurality of fuel spray nozzles or other suitable fuel injection means 26. The fuel supply system 24 includes, in series flow relationship, engine driven pump means 28, a filter 30, fuel control means 32, pressure regulator means 34 and a flow meter 36. The pump means 28 includes a low pressure centrifugal pump 38 and a serially connected high pressure gear pump 40, with the centrifugal pump 38 being connected to a source of fuel, normally pressurized by an aircraft boost pump (not shown), through a conduit 42. The pumps 38 and 40 are drivingly connected, as indicated at 44, to an engine rotor, such as the compressor rotor 22, through bevel gears 46 and 48 or other suitable power transfer means.

The fuel control means 32, as will be understood, is of the well-known type adapted to receive pressurized fuel from the pump means 28 and provide the desired fuel flow to the fuel injection means 26 in response to the position of a pilot-actuated throttle lever (not shown) and selected parameters of engine operation. Shutoff valve means 54 are provided for opening and closing fuel flow from the fuel control means in response to an engine shutoff signal which may be generated by a manually operated engine shutoff lever 52. Although the shutoff valve means 54 may be provided as a separate element in the system 24, it is normally packaged as an integral part of the fuel control means 32.

A fuel nozzle and manifold drain system has been shown schematically at 56 as including a drain can or container 58, drain valve means 60, and associated connecting conduits 59, 61 and 66. In the depicted embodiment, the drain valve means 60 is connected to the outlet of the fuel control means 32 through conduits 62, 64 and 66 and is of the well-known type adapted to close communication between conduits 61 and 59 in response to a predetermined fluid pressure level in conduit 66 and to open communication between conduits 61 and 59 when the fluid pressure in conduit 66 has been relieved. It should be understood, however, that valve means 60 may be mechanically or electrically actuated.

During operation of the engine 10, fuel pressurized by the aircraft boost pump (not shown) is further pressurized by pump means 28 and directed to the fuel control means 32 through a conduit 50 and, if desired, a filter 30. With the shutoff valve means 54 in its open position, the fuel control means 32 provides the desired fuel flow to the combustion section 14 through fuel injection means 26 and suitable connecting conduits or manifolding 61, 62, 68 and 70. If desired, means may be provided intermediate the fuel control means and fuel injection means to regulate the fuel pressure and meter fuel flow, as schematically shown at 34 and 36, respectively. When the lever 52 is moved to the engine shutoff position, a suitable mechanical, electrical or pressure signal effects closure of valve means 54, whereupon the fluid pressure within conduit 62 decays by operation of a bleed orifice 69 which is connected in parallel with the pressure regulator means 34 between conduits 62 and 68. As will be understood, the bleed orifice 69 may be packaged integrally with the pressure regulator means 34 or it may be provided as a separate element.

As previously mentioned, when the fuel pressure level within conduit 62, and hence conduit 66, is relieved, drain valve means 60 opens and residual fuel in the portion of fuel supply system 24 which is downstream of shutoff valve 54 flows to the drain can 58 by operation of gravity and/or the pressure differential between the combustion section 14 and the drain can 58.

In accordance with the present invention, eductor pump and valve means 74 are suitably connected to the fuel supply system 24 and the manifold drain system 56 so as to automatically recycle or pump residual fuel, upon engine shutoff, from the drain can 58 to the fuel supply system 24.

With continued reference to FIG. 1, the eductor pump and valve means 74 has been shown as including a housing 76 having a residual fuel inlet 78, a high pressure fuel inlet 80, a valve control inlet 82 and an outlet 84. The inlet 78 is connected to the drain can 58 through a conduit 86 and the inlet 80 is connected to the outlet of pump means 28 through a suitable conduit 88. The valve control inlet 82 is connected to conduit 66 so as to receive the pressure signal delivered to drain valve means 60 while the outlet 84 is connected through a conduit 90 to the inlet of pump means 28.

Turning now to FIG. 2, the means 74 have been shown in half cross section as comprising eductor pump means 92 and valve means 94 for selectively communicating inlets 78 and 80 with the pump means 92.

The valve means 94 includes a valve piston 96 which is disposed within a cylindrical bore 98 of a valve sleeve 100. The valve piston 96 carries a plunger 102 at one end which is adapted to engage a valve seat 104 to close the inlet 78. The piston 96 is formed with a face 106 which is acted upon by the pressure signal at inlet 82 to drive or maintain the piston 96 in the position of FIG. 2 during operation of the engine 10.

Means, such as a spring 108 which extends between the housing 76 and a shoulder 110 carried by the piston 96, are provided to yieldingly urge the piston to the position of FIG. 3 upon engine shutdown.

The plunger 102 is reciprocally carried within a bore 112 formed in the piston 96 and includes a shoulder 114 which abuts the piston 96 to limit its excursion into the piston bore 112. Means, such as a spring 116, are provided to yieldingly urge the plunger 102 into inlet closing engagement with the valve set 104, as shown in FIG. 4, so as to provide a check valve to prevent reverse flow from the eductor 92 to the drain can 58 when the piston 96 is disposed as in FIGS. 3 and 4.

The inlet 80 communicates with an annular chamber 118 which is cooperatively defined by the sleeve 100 and housing 76. As best shown in FIG. 3, the piston 96 is formed with a groove 120 which communicates the chamber 118 with a similar, axially spaced chamber 122 through sleeve passageways 124 and 126. It should be noted that the groove 120 is axially sized in relationship to passageways 124 and 126 such that when the piston 96 is urged by the pressure at inlet 82 to its position of FIG. 1, communication between annular chamber 122 and the inlet 80 is closed.

Turning now to the eductor pump means 92, a suction chamber 128 is cooperatively defined by the housing 76 and nozzle and receiver members, 130 and 132, respectively, which are threadably or otherwise suitably secured to the housing 76.

The member 130 includes a nozzle 134 which projects into the chamber 128 and is adapted to deliver a high velocity stream of fuel through a passageway 136 to a spaced receiver member passage 138 which communicates with outlet 84. The member 130 and the housing 76 are formed with suitable passageways as at 140, 142 and 144, for communicating pressurized fuel within the annular chamber 122 with nozzle passageway 136.

The suction chamber 128 is communicated with the inlet 78 through the check valve means 146, chambers 148 and 150, and suitable passageways, as at 152 and 154.

The inlet 78 and valve seat 104 may be conveniently defined by a member 156 which is threadably or otherwise suitably secured to the housing 76 so as to retain the valve sleeve 100 in operative position through abutment with a spacer sleeve 158 through which passages 152 are formed.

The use, operation and function of the present invention are as follows:

With the engine operating, the desired fuel flow rate is delivered to fuel injector means 26 by the fuel control means 32 through conduits, as at 62, 68, 70 and 61, and any desired system elements, such as the pressure regulator means 34 and flow meter 36. At the same time the fuel pressure at the outlet of the fuel control means 32 is directed to the drain valve means 60 and the inlet 82 of eductor pump and valve means 74 through conduits, as at 62, 64 and 66. During engine operation the fuel pressure within conduit 66 maintains drain valve means 60 in a position closing communication between conduits 61 and 59 and urges valve piston 96 to the position of FIG. 2, wherein the valve 146 and the sleeve passageway 124 are closed.

Upon closure of shutoff valve means 54, the fuel pressure within conduit 66 is relieved through the operation of the bleed orifice 69, whereupon drain valve means 60 opens communication between conduits 61 and 59, and residual fuel within the portion of the fuel supply system 24 which is downstream of valve 54 drains into the drain can 58. At the same time, when the pressure within conduit 66 is reduced to a predetermined level, means 108 yieldingly urges the valve piston 96 from its position of FIG. 2 to the position of FIG. 3.

As will be understood, the rotational speed and inertia of the compressor rotor are sufficiently high so that upon engine shutoff there is a coast-down period of some duration. With the valve piston 96 in the position of FIG. 3, the fuel which is pressurized by the pump means 28 during engine coast-down or spin-down is supplied as motive fluid to the eductor pump nozzle passage 136, through, in part, conduits 50 and 88.

As will be understood, the nozzle passageway 136 is sized to deliver fuel to the receiver passageway 138 as a high velocity fluid stream. As this high velocity fluid stream traverses the gap between the nozzle 134 and the receiver 132 and enters the receiver passage 138, an exchange of momentum and energy occurs between the high velocity fuel stream and the residual fuel within suction chamber 136. A shear plane is set up and, through the mechanics of viscous shear and fluid diffusion, the momentum and kinetic energy of the high velocity stream is utilized to pump the residual fuel from the chamber 128 to the inlet of pump means 28. Such eductor pump action generates sufficient suction on the chamber 128 side of check valve means 146 to lift the plunger 102 from its seat 104, as shown in FIG. 3 and against the urging of spring 116, so as to permit free flow of the residual fuel from the drain can 58 to the chamber 136. In this manner, residual fuel which has been collected by the drain can 58 is automatically pumped or recycled to the fuel system after each engine shutdown.

By providing the valve means 94, it should be noted that the pressurized fuel output of pump means 28 is diverted for use as the motive fluid to drive the eductor pump 92 only during engine coast-down or when the shutoff valve 54 is closed. Accordingly, the present invention does not detract from the reduced fuel flow rates generated by the pump means during engine start-up and may, therefore, be applied on a retrofit basis to systems which have a pump capacity at engine start-up which is closely sized to start-up fuel requirements. This feature of the present invention also enables the eductor pump to be sized to receive a substantially increased flow rate of eductor motive fluid from the pump means 28 over that which would be available on a continuous operation basis so that the eductor may pump a relatively high flow rate of residual fuel against the pressure head of the aircraft boost pump. The ability of the present system to pump required flow rates against the aircraft boost pump pressure is further enhanced by the use of fuel which is pressurized by the high pressure pump, such as the gear pump 40, of a two-pump system, in lieu of fuel which is pressurized only by the low pressure pump 38, as in the case of the previously discussed continuously operating fuel vapor eductor system.

As the engine coasts down and the eductor pump action is lost, the plunger 102 is yieldingly urged against valve seat 104, as shown in FIG. 4, to prevent reverse flow of fuel from the inlet 78 to the container 58.

While a preferred embodiment has been depicted and described as including a drain can or container 58, it will be appreciated that container 58 may be eliminated and the inlet 78 may be connected directly to conduit 59.

In applications where it is desired that air be prevented from entering conduit 86, suitable float valve means of well-known construction may be provided in the container 58 as schematically indicated at 160.

Continuing with the operation of the present invention, when the engine 10 is restarted, a pressure build-up occurs in conduit 66 which closes drain valve means 60 and returns the valve piston 96 to its first position of FIG. 2, wherein the pump and valve means 74 and associated system are readied for another drain cycle.

From the foregoing, it will be understood that the present invention provides relatively simple, compact, economical and reliable means for automatically pumping residual fuel from the engine fuel injectors or nozzles and associated conduits or manifolds to a point in the engine fuel supply system upstream of the fuel shutoff valve in a manner which does not tax normal engine operation. In this manner, the present invention not only solves the ecological problem associated with prior systems which dumped such residual fuel overboard to the atmosphere upon aircraft takeoff, but results in a conservation or saving of up to one gallon or more of fuel per engine per aircraft landing. Such operating economy, when projected over the service life of an engine, enhances the attractiveness of the present invention as an anti-pollution or ecological device.

While the present invention has been described in connection with an aircraft gas turbine engine of the single rotor turbojet type, it will be appreciated that usage is not limited thereto and that the present invention may be effectivly employed on multi-rotor turbofan engines or other gas turbine engines. Further, while an embodiment of the present invention has been depicted and described, such is intended to be exemplary only and not definitive and it will be appreciated by those skilled in the art that many modifications, changes and substitutions may be made thereto without departing from the fundamental theme of the invention.

What is claimed is:

1. For use with a gas turbine engine, in combination,
   fuel supply means including means for injecting fuel into a combustion section of said engine, pump means for delivery of pressurized fuel to said fuel injecting means, and shutoff valve means for interrupting fuel flow to said fuel injecting means to effect engine shutoff;
   drain valve means for draining fuel from the portion of said fuel supply means disposed downstream of said shutoff valve means upon closure of said shutoff valve means;
   eductor pump means for pumping said drained fuel to a point in said fuel supply system disposed upstream of said shutoff valve means; and
   pump valve means responsive to said shutoff valve means for directing fuel pressurized by said pump means during engine spindown to said eductor pump means, as motive fluid therefor, and for preventing such flow during engine operation, whereby said drained fuel is automatically recycled to the fuel system after each engine shutdown without charge to the pump means during engine operation.

2. The structure of claim 1 further characterized in that said pump means includes serially connected low and high pressure pumps, with said pump valve means operative to direct the output of said high pressure pump to said eductor pump means.

3. The structure of claim 1 further characterized in that said pump valve means is responsive to the pressure in said fuel supply system downstream of said shutoff valve means and includes check valve means for preventing reverse flow from said eductor pump toward said drain valve means.

4. The structure of claim 3 further characterized by and including a container for receiving drained fuel from said drain valve means, said eductor pump means including a suction side which is operatively connected to said container through said check valve means.

5. Apparatus for use with a gas turbine engine of the type having a fuel supply system including means for injecting fuel into the combustion section of said engine, pump means for delivery of pressurized fuel to said fuel injector means, shutoff valve means for closing fuel flow to said fuel injector means to effect engine shutoff and drain valve means for draining fuel from the portion of said fuel supply system disposed downstream of said shutoff valve means, said apparatus comprising:
   a housing including a first inlet for receiving pressurized fuel from said pump means, a second inlet for receiving drained fuel from said drain valve means, and an outlet for connection with said fuel supply system upstream of the outlet of said pump means;
   eductor pump means for receiving high and low pressure fuel and for utilzing the energy of said high pressure fuel to pump said low pressure fuel to said outlet; and
   pump valve means for delivery of pressurized fuel from said first inlet to said eductor pump means in response to a signal indicative of closure of said shutoff valve means, where said drained fuel is automatically recycled to said fuel supply system during engine spindown.

6. The apparatus of claim 5 further characterized by and including check valve means disposed between said second inlet and said eductor pump means for preventing fuel flow directioned from said eductor pump to said second inlet.

7. The apparatus of claim 6 further characterized in that said signal is the fuel pressure downstream of said shutoff valve means.

* * * * *